United States Patent
Yu et al.

(10) Patent No.: US 8,300,608 B2
(45) Date of Patent: Oct. 30, 2012

(54) FAINT CONNECTIVITY SESSION SETUP

(75) Inventors: Yi Yu, Irving, TX (US); James E. Womack, Irving, TX (US); Zhijun Cai, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 419 days.

(21) Appl. No.: 12/558,245

(22) Filed: Sep. 11, 2009

(65) Prior Publication Data
US 2010/0067501 A1    Mar. 18, 2010

Related U.S. Application Data

(60) Provisional application No. 61/096,648, filed on Sep. 12, 2008.

(51) Int. Cl.
*H04W 4/00* (2009.01)
*H04W 72/00* (2009.01)
*H04J 3/00* (2006.01)

(52) U.S. Cl. ........ 370/336; 370/329; 455/450; 455/451; 455/452.1; 455/452.2

(58) Field of Classification Search .................. 370/336; 455/450, 451, 452.1, 452.2
See application file for complete search history.

(56) References Cited

U.S. PATENT DOCUMENTS

| | | | |
|---|---|---|---|
| 6,487,519 B1 | 11/2002 | O'Neill et al. | |
| 2003/0026324 A1* | 2/2003 | Li et al. | 375/141 |
| 2007/0047483 A1 | 3/2007 | Khan | |
| 2008/0167075 A1* | 7/2008 | Kurtz et al. | 455/561 |
| 2008/0212506 A1 | 9/2008 | Lee et al. | |
| 2008/0285670 A1* | 11/2008 | Walton et al. | 375/260 |
| 2009/0257408 A1* | 10/2009 | Zhang et al. | 370/336 |
| 2010/0067412 A1* | 3/2010 | Kitazoe et al. | 370/294 |
| 2010/0192035 A1* | 7/2010 | Sagfors et al. | 714/748 |
| 2010/0279634 A1* | 11/2010 | Sagfors et al. | 455/127.1 |

FOREIGN PATENT DOCUMENTS

WO    2008097030 A1    8/2008

OTHER PUBLICATIONS

3GPP TDoc R2-072630, HARQ operation in case of UL Power Limitation, Ericsson, Jun. 2007.*
European Extended Search Report; Application No. 09813708.6; Aug. 16, 2011; 8 pages.
3GPP TSG RAN WG2 #60bis; "Offline Discussion on Message 3 Contents for Idle UE and TTI Bundling for Message 3"; R2-080596; Jan. 14-18; Seville, Spain; 6 pages.
3GPP TSG-RAN WG2 #55; "Initial Random Access Procedure for E-UTRAN"; R2-062853; Oct. 9-13, 2006; Seoul, Korea; 6 pages.
3GPP TSG-RAN WG2 #61bis; "Text Proposal for TTI Bundling"; R2-081466; Mar. 31-Apr. 4, 2008; Shenzhen, China; 8 pages.
PCT International Search Report; PCT Application No. PCT/US2009/056721; Nov. 2, 2009; 2 pgs.
PCT Written Opinion of the International Searching Authority; PCT Application No. PCT/US2009/056721; Nov. 2, 2009; 4 pgs.

(Continued)

*Primary Examiner* — Ayaz Sheikh
*Assistant Examiner* — Tarell Hampton
(74) *Attorney, Agent, or Firm* — Conley Rose, P.C.; J. Robert Brown, Jr.

(57) ABSTRACT

A method for communicating is provided. The method comprises communicating regarding transmission time interval (TTI) bundling related to one or more random access (RA) messages.

28 Claims, 5 Drawing Sheets

OTHER PUBLICATIONS

Mexican Office Action; Application No. MX/a/2011/002652; May 4, 2012; 8 pages.

3GPP TS 36.300v8.5.0; 3rd Generation Partnership Project; Technical Specification Group Radio Access Network; Evolved Universal Terrestrial Radio Access (E-UTRA) and Evolved Universal Terrestrial Radio access Network (E-UTRAN); Overall Description; Stage 2; Release 8; May 2008; 134 pgs.

3GPP TS 36.211v8.3.0; 3rd Generation Partnership Project; Technical Specification Group Radio Access Network; Evolved Universal Terrestrial Radio Access (E-UTRA); Physical Channels and Modulation; Release 8; May 2008; 77 pgs.

3GPP TS 36.321v8.2.0; 3rd Generation Partnership Project; Technical Specification Group Radio Access Network; Evolved Universal Terrestrial Radio Access (E-UTRA) Medium Access Control (MAC) Protocol Specification; Release 8; May 2008; 33 pgs.

3GPP TSG-RAN WG2 Meeting #62bis; Title: Report of E-UTRA User Plane Session; Warsaw, Poland; Jun. 30-Jul. 4, 2008; 25 pgs.

* cited by examiner

FAINT CONNECTIVITY SESSION SETUP

CROSS-REFERENCE TO RELATED APPLICATIONS

The present application claims priority to U.S. provisional patent application No. 61/096,648, filed Sep. 12, 2008, by Yi Yu et al, entitled "Faint Connectivity Session Setup" (34037-US-PRV-4214-10800), which is incorporated by reference herein as if reproduced in its entirety.

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as desktop computers, set-top boxes, or network nodes and therefore may also be referred to as user equipment "UE". When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE ENB, or other such devices that can provide a UA with access to other components in a telecommunications system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method for communicating is provided. The method includes communicating regarding transmission time interval (TTI) bundling related to one or more random access (RA) messages.

In an alternative embodiment, a user agent (UA) is provided. The UA includes a processor configured to communicate regarding transmission time interval (TTI) bundling related to one or more a random access (RA) messages.

in an alternative embodiment, an access device is provided. The access device includes, a processor configured to communicate regarding transmission time interval (TTI) bundling related to one or more a random access (RA) messages.

Communication in pooled radio and Internet-based networks might involve voice, video and/or data sessions carried out through, for example, voice-over-Internet-Protocol (VoIP) or other procedures. Under current proposals, a VoIP session procedure may be initiated through a four-step random access (RA) procedure. The RA procedure provides steps for allocating a resource to, for example a UA, such that the UA can initiate a data transmission to a network access device. In the RA procedure, the UA sends a first RA message to the network access device over one or more available radio channel(s). The channel might include one or more dedicated channel(s) between the UA and the network access device that might be established specifically for the purpose of the UA requesting network resources (e.g., a radio channel) for establishing the session. Note that in this step, multiple UAs may use the same channel to send the first message, which may cause contention.

In a second step, responsive to receiving the first RA message requesting a resource (e.g., a radio channel), the network access device sends a second RA message via the downlink channel. The second RA message provides a resource allocation or uplink (UL) grant of a radio resource.

In a third step, the UA or UAs may use the allocated resource to send the network access device a third RA message, mostly for the purpose of contention resolution. The third message might include a UA-specific identity for contention resolution. Additionally the third message may include, for example, buffer status information to inform the network access device of, for example, the quantity of data required to be sent by the UA.

In a fourth step, the network access device sends a fourth RA message indicating to the UA that no contention (i.e., the third RA message was successfully decoded by the network access device) is present and that the UA is allowed an amount of resource capacity appropriate for establishing the session. The fourth random access message might also include any QoS or other requirement or considerations specified in the buffer status report. After the fourth RA message is acknowledged, the UA is connected to the network access device.

When poor network conditions that cause faded signals or interference are present, establishing a session can be difficult. During the RA procedure, the third message might, for example not be decoded by the network access device. Under these conditions, the UA may re-transmit the third RA message utilizing certain error correcting procedures, such as a Hybrid Automatic Repeat Request (HARQ). However, even with using error correction procedures, the UA may have difficulty establishing a session with the network access device. Also, when the UA is currently connected (i.e., in RCC_Connected mode), significant delays and interruptions in service occur during poor network conditions.

To address the potential problems and the inefficiencies that may arise when using the currently proposed four-step random access procedure during poor radio or signaling conditions, in a first proposal or embodiment the RA messages, such as the third RA message, can be transmitted from the UA using a technique known as transmission time interval (TTI) bundling. TTI bundling is well known and used to improve communications under poor channel conditions, after a resource has already been established. The current disclosure provides for using TTI bundling during the initial resource allocation, such as during the above RA procedure. TTI bundling relates to the length of the message and involves dividing bits of the message into blocks that are encoded and interleaved. Theses blocks include multiple instances of the message so that when the network access device decodes the message, if errors occur with certain bits, the bits from additional blocks in the TTI bundle might be used to successfully decode the message. This allows the network access device to decode the message under poor channel conditions and reduces the necessity for retransmission.

Before the UA initiates transmission of the message using TTI bundling, the network access device may need to allocate an appropriate resource. Accordingly, in one embodiment, a special preamble group or other indicator might be present in the first RA message sent by the UA to the network access device. The special preamble group might include one or more instructions requesting that the network access device allocate a resource sufficient to use TTI bundling in, for example, the third RA message. In some instances, the UA might transmit a special preamble within the special preamble group indicating to use TTI bundling in the first RA message to access the network access device, and the special preamble group may be indicated in the Broadcast Control Channel (BCCH). In response to receiving the special preamble or indicator from the UA, the network access device allocates a resource so that the UA can use TTI bundling in the third RA message.

The preamble is well defined in the Third Generation Partnership Project (3GPP) Technical Specification (TS) 36.211, chapter 5.7.2. There are totally 64 preambles available. A special preamble group, for example, preamble index 1, 2, 3, 4, 5, 6, 7, 8, might be defined to indicate the UA's TTI bundling request for the third RA message. These preambles can form a special preamble group, and the ENB can signal this preamble subset over the BCCH to the UAs in the cell. When a UA receives this special preamble subset, if the UA determines that it needs TTI bundling for the third RA message, the UA might use one of the preambles in this subset (i.e., preamble index 1, 2, 3, 4, 5, 6, 7, 8) to deliver the first RA message to indicate the TTI bundling request.

By identifying poor channel conditions and implementing TTI bundling during the RA procedure the resulting communication may have improved signaling and reduced retransmissions. In another embodiment, the UA might monitor a signal power and determine a signal-to-noise ratio (SNR) of one or more channels associated with the network access device. If, for example, the SNR is less than a certain threshold, which might be set by either the UA or the network access device, the UA might initiate use of TTI bundling as described above.

Figure 1:
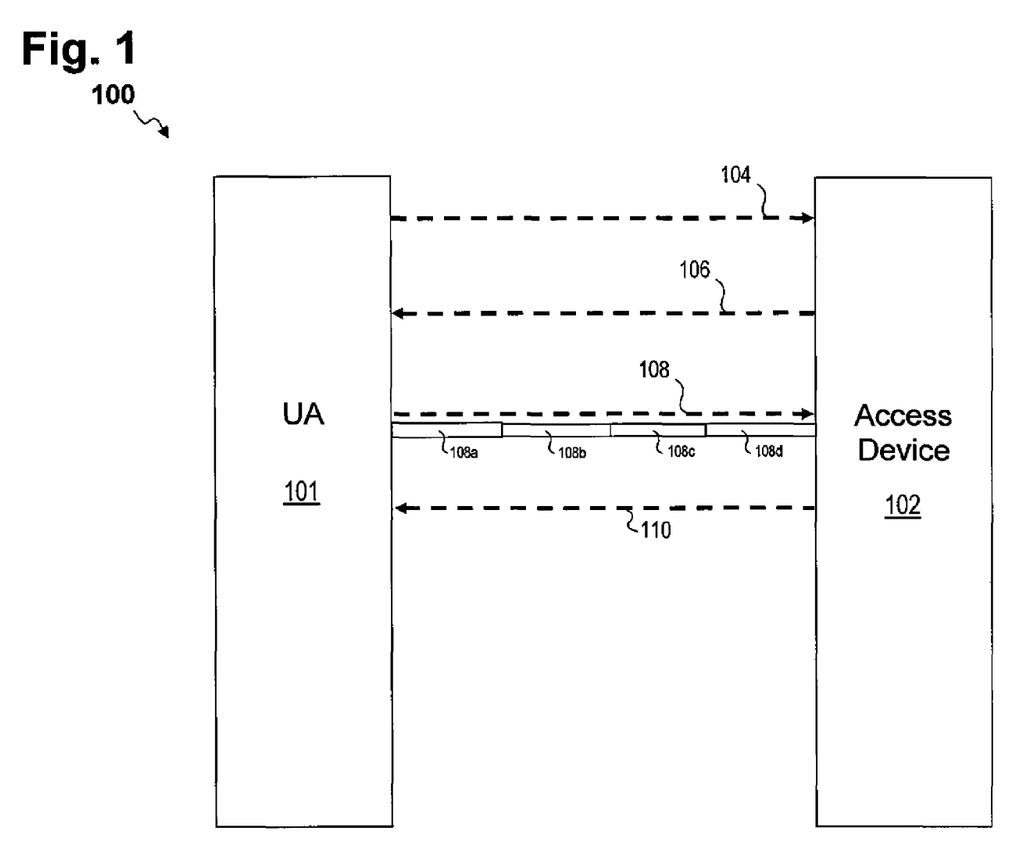
FIG. 1 is an illustration of a telecommunications system according to an embodiment of the disclosure.

Referring to FIG. 1, illustrated is an embodiment of a telecommunications system 100 for establishing a session. FIG. 1 is exemplary and may have other components or arrangements in other embodiments. In an embodiment, the system 100 might be or include a portion of an evolved packet system (EPS), or a Global System for Mobile Communication (GSM) Enhanced Data Rates (EDGE) Radio Access Network (GERAN) network, or a Universal Mobile Telecommunications System (UMTS) Terrestrial Radio Access (UTRAN) network or perhaps other networks. The system 100 includes an access device 102 that might be included in a radio access network using a 3GPP evolved UTRAN (EUTRAN or LTE), or a GERAN or a UTRAN network or perhaps other technologies. Internet protocols (IP) IPV4, IPV6, GTP, and/or other current or future protocols may be supported by these technologies. In addition, the access device 102 may be serviced by any or a combination of Internet Protocol-based networks, packet-based networks, public switched telecom networks (PSTN), and/or integrated services digital networks.

The access device 102 may communicate with a UA 101 by exchanging random access (RA) messages 104, 106, 108, and 110. When the UA 101 desires to establish or re-establish a session with the access device 102, the UA 101 as described above, might send a RA message one 104 to the access device 102. Upon receiving the RA message one 104, the access device 102 provides a dynamic grant to the UA 101 of a network resource (e.g., one or more radio channel(s)) through a RA message two 106. The network resource might be of sufficient capacity to handle a RA message that the UA 101 might anticipate to be sent to the access device 102. The access device 102 subsequently determines the size of the network resource based on a certain expected data packet payload, which may be based on the size of a typical packet data and on the channel conditions that may currently exist between the UA 101 and the access device 102.

Upon receiving the RA message two 106 granting the resource, the UA 101 sends a RA message three 108 to the access device 102, mostly for the purpose of contention resolution. The access device 102, using standard techniques, can determine that the received packet is the RA message three 108. Upon making this determination, the access device 102 can send a RA message four 110 to the UA 101.

As discussed above, when the UA 101 determines that poor radio or channel conditions exist between the UA 101 and the access device 102, the UA 101 might initiate TTI bundling during various RA procedures. The UA 101 might measure channel conditions in various manners, such as SNR or others, against a threshold set by the access device 102, the UA 101, or other systems. Based on the channel quality, the UA 101 may request, such as in the RA message one 104, resources for TTI bundling. This request by the UA 101 in the RA message one 104 might be an indicator, such as a special preamble, that when decoded by the access device 102 indicates to allocate a resource for TTI bundling for RA message three 108. In some embodiments, the set of special preambles (the preamble group) might be transmitted in the BCCH, but might be transmitted elsewhere in other embodiments.

Responsive to receiving the indicator from the UA 101, the access device 102, in the RA message two 106, allocates a resource sufficient by use by the UA 101 to transmit the RA message three 108 using TTI bundling. Responsive to being allocated the resource in the RA message two 106, the UA 101 transmits the RA message three 108 using TTI bundling, which includes multiple concurrent retransmissions of the RA message three 108 as indicated as 108a-d.

The above RA procedures may be applicable for the RRC_IDLE (no connection) or RRC_Connected (connected to access device 102, but where the UA 101 might not have a designated resource). Thereafter, the RA message four 110 and subsequent communications may proceed substantially as usual.

Figure 2:
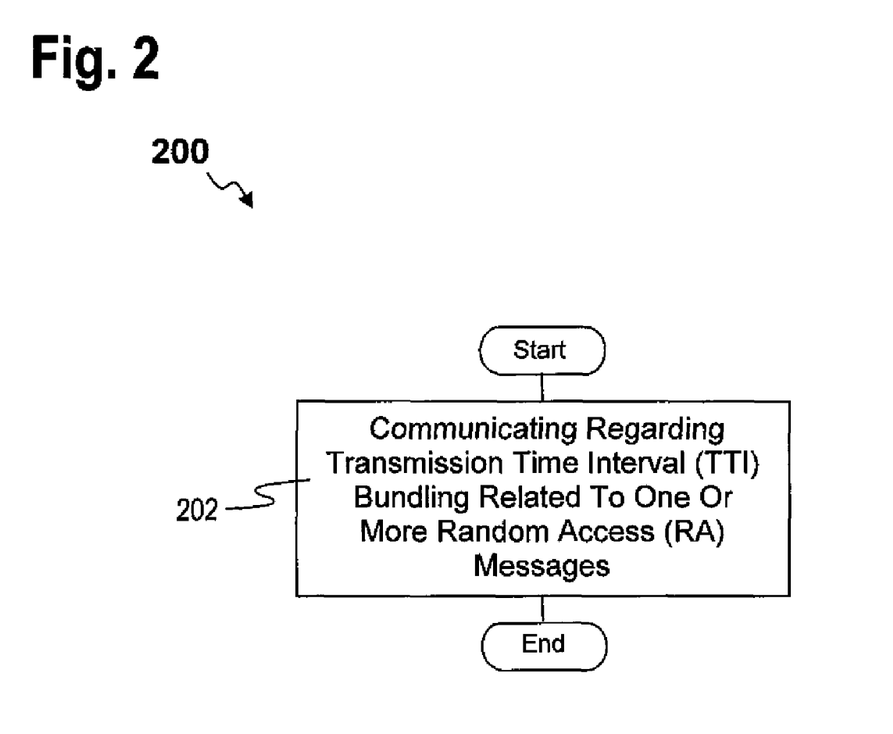
FIG. 2 is a flow chart of a method for communicating according to an embodiment of the disclosure.

FIG. 2 illustrates an embodiment of a method communicating. At block 202, communicating regarding transmission time interval (TTI) bundling related to one or more random access (RA) messages is provided. FIG. 2 is exemplary and other flow charts and procedures could be used.

Figure 3:
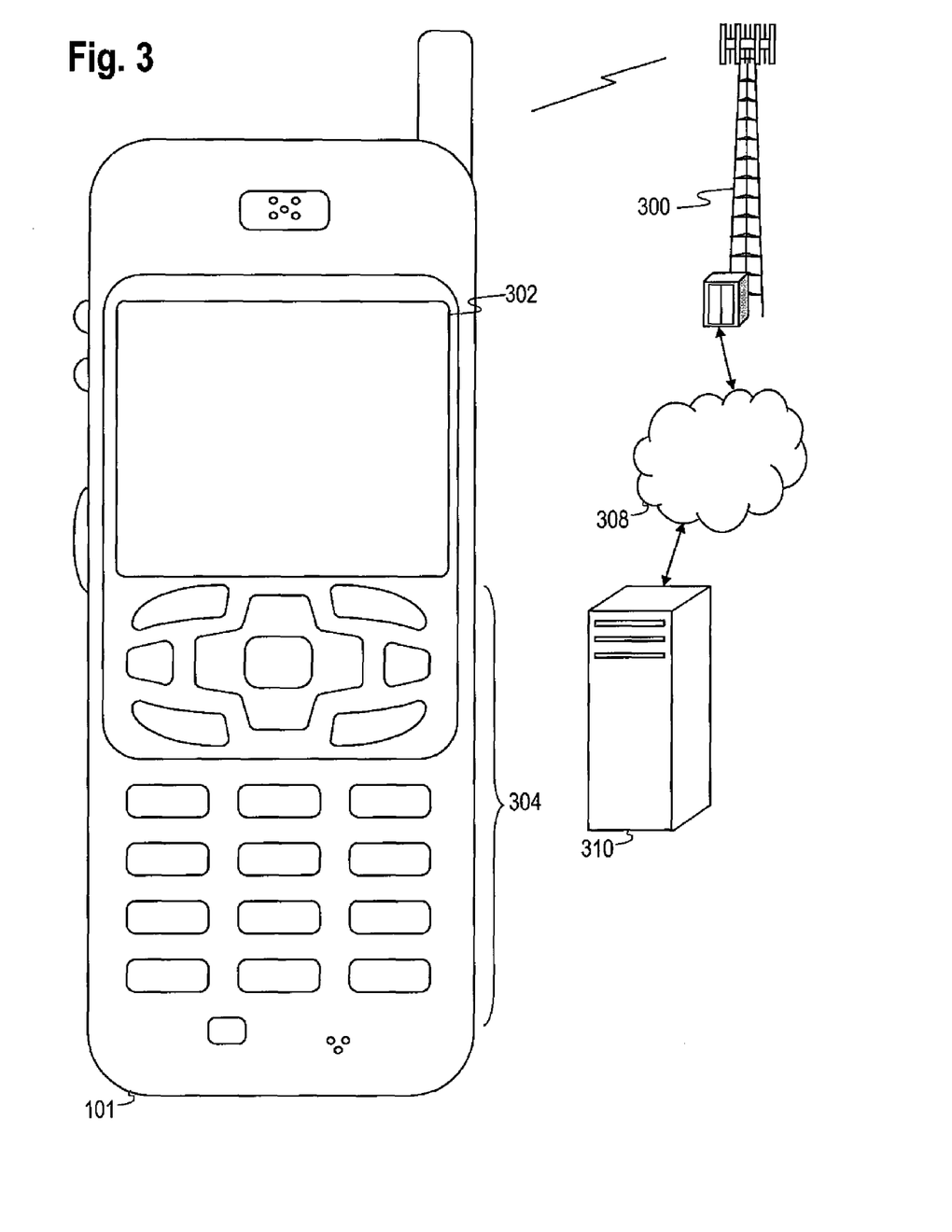
FIG. 3 is a diagram of a wireless communications system including a user agent operable for some of the various embodiments of the disclosure.

FIG. 3 illustrates a wireless communications system including an embodiment of the UA 101. The UA 101 is operable for implementing aspects of the disclosure, but the disclosure should not be limited to these implementations. Though illustrated as a mobile phone, the UA 101 may take various forms including a wireless handset, a pager, a personal digital assistant (PDA), a portable computer, a tablet computer, or a laptop computer. Many suitable devices combine some or all of these functions. In some embodiments of the disclosure, the UA 101 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 101 may be a portable, laptop or other computing device. The UA 101 may support specialized activities such as gaming, inventory control, job control, and/or task management functions, and so on.

The UA 101 includes a display 302. The UA 101 also includes a touch-sensitive surface, a keyboard or other input keys generally referred as 304 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 101 may present options for the user to select, controls for the user to actuate, and/or cursors or other indicators for the user to direct.

The UA 101 may further accept data entry from the user, including numbers to dial or various parameter values for configuring the operation of the UA 101. The UA 101 may further execute one or more software or firmware applications in response to user commands. These applications may configure the UA 101 to perform various customized functions in response to user interaction. Additionally, the UA 101 may be programmed and/or configured over-the-air, for example from a wireless base station, a wireless access point, or a peer UA 101.

Among the various applications executable by the UA 101 are a web browser, which enables the display 302 to show a web page. The web page may be obtained via wireless communications with a wireless network access node, a cell tower, a peer UA 101, or any other wireless communication network or system 300. The network 300 is coupled to a wired network 308, such as the Internet. Via the wireless link and the wired network, the UA 101 has access to information on various servers, such as a server 310. The server 310 may provide content that may be shown on the display 302. Alternately, the UA 101 may access the network 300 through a peer UA 101 acting as an intermediary, in a relay type or hop type of connection.

Figure 4:
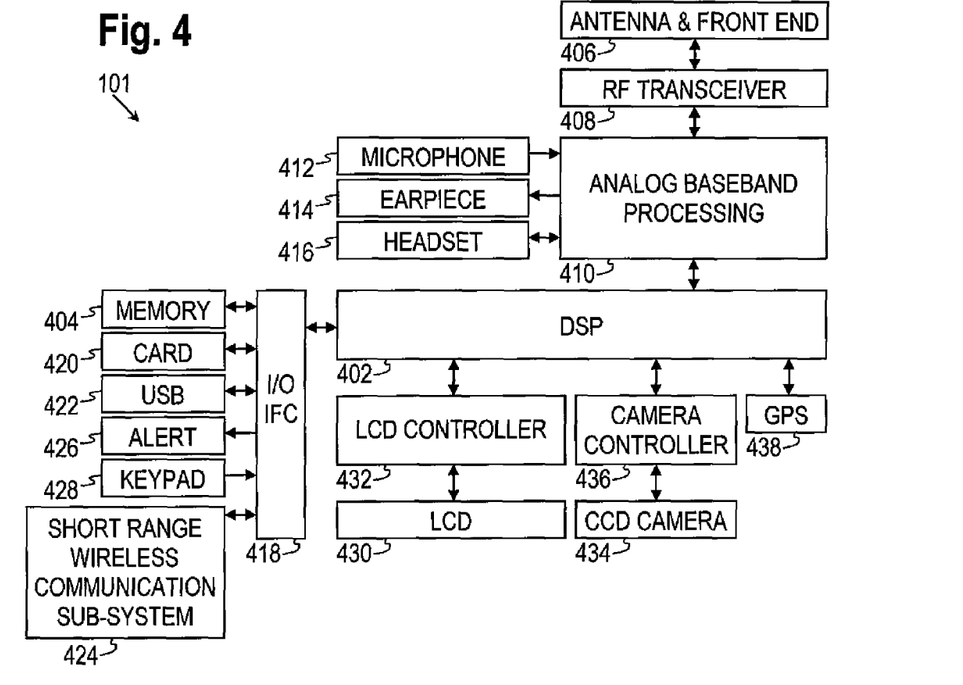
FIG. 4 is a block diagram of a user agent operable for some of the various embodiments of the disclosure.

FIG. 4 shows a block diagram of the UA 101. While a variety of known components of UAs 101 are depicted, in an embodiment a subset of the listed components and/or additional components not listed may be included in the UA 101. The UA 101 includes a digital signal processor (DSP) 402 and a memory 404. As shown, the UA 101 may further include an antenna and front end unit 406, a radio frequency (RE) transceiver 408, an analog baseband processing unit 410, a microphone 412, an earpiece speaker 414, a headset port 416, an input/output interface 418, a removable memory card 420, a universal serial bus (USB) port 422, a short range wireless communication sub-system 424, an alert 426, a keypad 428, a liquid crystal display (LCD), which may include a touch sensitive surface 430, an LCD controller 432, a charge-coupled device (CCD) camera 434, a camera controller 436, and a global positioning system (GPS) sensor 438. In an embodiment, the UA 101 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the UA 101 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the UA 101 to send and receive information from a cellular network or some other available wireless communications network or from a peer UA 101. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF Transceiver 408, portions of the Antenna and Front End 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece 414 and the headset 416. To that end, the analog baseband processing unit 410 may have ports for connecting to the built-in microphone 412 and the earpiece speaker 414 that enable the UA 101 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the short range wireless communication sub-system 424. The USB interface 422 may be used to charge the UA 101 and may also enable the UA 101 to function as a peripheral device to exchange information with a personal computer or other computer system. The short range wireless communication sub-system 424 may include an infrared port, a Bluetooth interface, an IEEE 802.11 compliant wireless interface, or any other short range wireless communication sub-system, which may enable the UA 101 to communicate wirelessly with other nearby mobile devices and/or wireless base stations.

The input/output interface 418 may further connect the DSP 402 to the alert 426 that, when triggered, causes the UA 101 to provide a notice to the user, for example, by ringing, playing a melody, or vibrating. The alert 426 may serve as a mechanism for alerting the user to any of various events such as an incoming call, a new text message, and an appointment reminder by silently vibrating, or by playing a specific pre-assigned melody for a particular caller.

The keypad 428 couples to the DSP 402 via the interface 418 to provide one mechanism for the user to make selections, enter information, and otherwise provide input to the UA 101. The keyboard 428 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 430, which may include touch screen capability and also display text and/or graphics to the user. The LCD controller 432 couples the DSP 402 to the LCD 430.

The CCD camera 434, if equipped, enables the UA 101 to take digital pictures. The DSP 402 communicates with the CCD camera 434 via the camera controller 436. In another embodiment, a camera operating according to a technology other than Charge Coupled Device cameras may be employed. The GPS sensor 438 is coupled to the DSP 402 to decode global positioning system signals, thereby enabling the UA 101 to determine its position. Various other peripherals may also be included to provide additional functions, e.g., radio and television reception.

Figure 5:
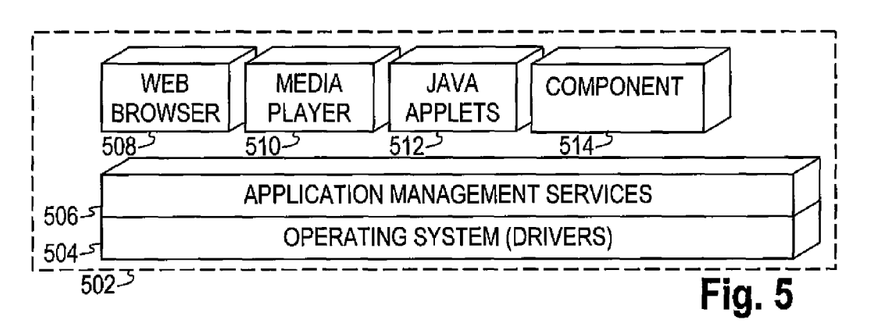
FIG. 5 is a diagram of a software environment that may be implemented on a user agent operable for some of the various embodiments of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the UA hardware with standardized interfaces that are accessible to application software. The operating system drivers 504 include application management services ("AMS") 506 that transfer control between applications running on the UA 101. Also shown in FIG. 5 are a web browser application 508, a media player application 510, and Java applets 512. The web browser application 508 configures the UA 101 to operate as a web browser, allowing a user to enter information into forms and select links to retrieve and view web pages. The media player application 510 configures the UA 101 to retrieve and play audio or audiovisual media. The Java applets 512 configure the UA 101 to provide games, utilities, and other functionality. A component 514 might provide functionality described herein. Although shown at an application layer, the component 514 might be provided at various layers within the environment 502 or elsewhere on the UA 101.

Figure 6:
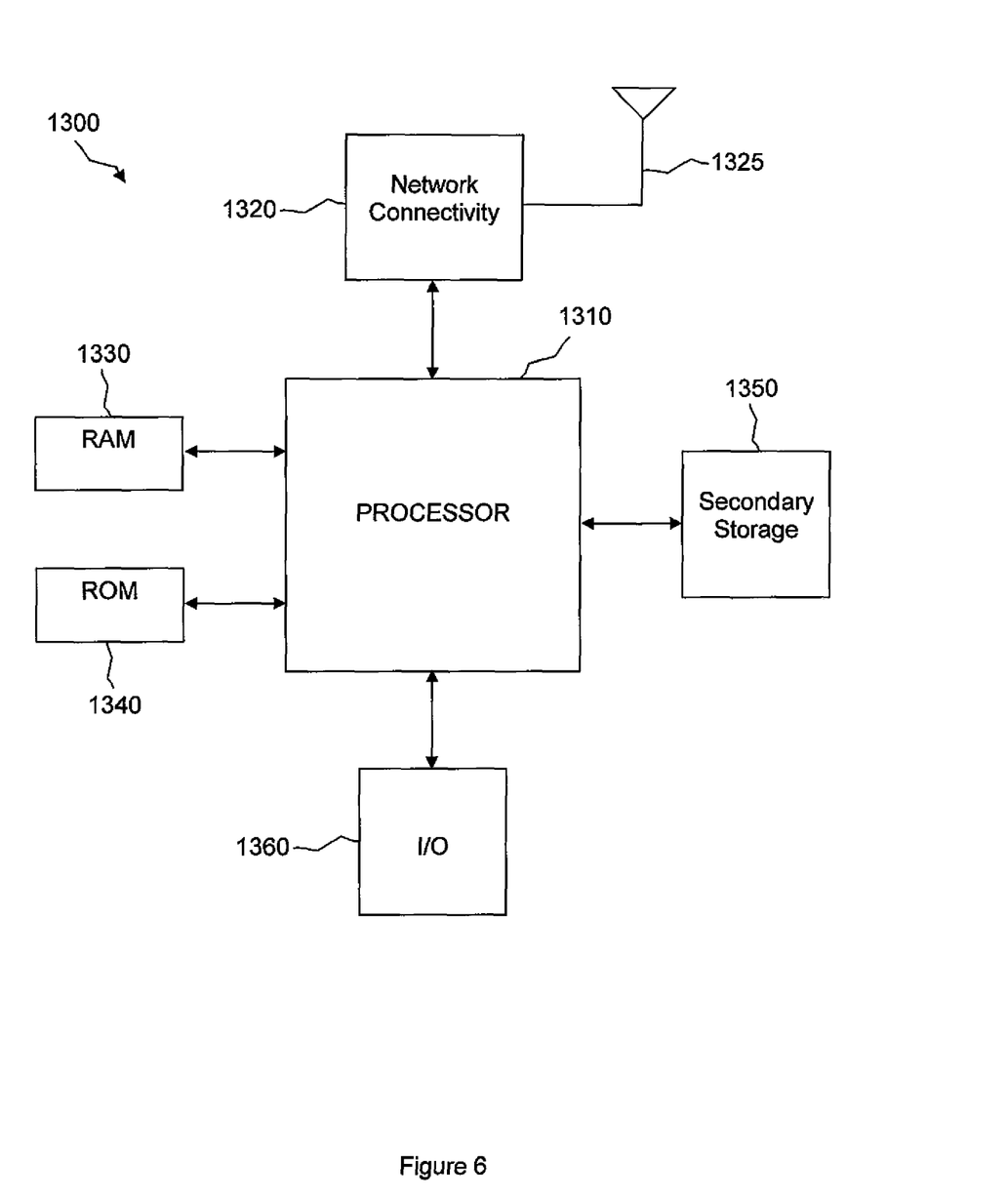
FIG. 6 illustrates an exemplary general-purpose computer system suitable for implementing the several embodiments of the present disclosure.

The UA 101 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 101, such as the display 402 and the input 404.

The following 3rd Generation Partnership Project (3GPP) Technical Specifications (TS) and documents are incorporated herein by reference for all purposes: TS36.321, TS36.300, and R2-083726 RAN2 #62bis, Warsaw, Poland.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for Random Access (RA) procedure between a user agent (UA) and an access device, comprising: sending, by the user agent, a RA message one to the access device, the RA message one indicating a special preamble, wherein the special preamble indicates a request for resource allocation with transmission time interval bundling in a RA message three, wherein the special preamble is selected from a special preamble group signaled by the access device; receiving, by the user agent, a RA message two from the access device, the RA message two providing a resource allocation or uplink grant of a radio resource in response to the RA message one; and sending, by the user agent, the RA message three to the access device using transmission time interval bundling provided in the RA message two.

2. The method of claim 1, wherein the RA message one includes an indicator indicating transmission time interval bundling is used in the RA message three.

3. The method of claim 1, wherein the RA message one includes an indicator indicating a request for resource allocation for transmission time interval bundling in the RA message three.

4. The method of claim 1, wherein the RA message two provides a resource allocation or uplink grant of a radio resource sufficient for the UA to use transmission time interval bundling in at least one of the RA messages.

5. The method of claim 3, wherein the RA message two provides a resource allocation or uplink grant of a radio resource sufficient for the UA to use transmission time interval bundling in at least one of the RA messages.

6. The method of claim 1, wherein the special preamble group is signaled to the UA in a Broadcast Control Channel.

7. The method of claim 1, further comprising the UA measuring a signal quality of at least one channel associated with the access device and determining whether to use transmission time interval bundling based on the measured signal quality.

8. The method of claim 7, wherein the signal quality is further defined as a signal-to-noise ratio, and further comprising determining whether to use transmission time interval bundling if the signal-to-noise ratio is below a threshold.

9. A method for establishing Random Access between a user agent (UA) and an access device, comprising:
receiving, by the access device, a IRA message one from the UA, the RA message one indicating a special preamble, wherein the special preamble indicates a request for resource allocation with transmission time interval bundling in a RA message three, wherein the special preamble is selected from a special preamble group signaled by the access device; sending, by the access device, a RA message two to the UA, the RA message two providing a resource allocation or uplink grant of a radio resource in response to the RA message one; and receiving, by the access device, the RA message three sent by the UA using transmission time interval bundling provided in the RA message two.

10. The method of claim 9, further comprising the access device providing a resource allocation or uplink grant of a radio resource sufficient for the UA to use transmission time interval bundling.

11. The method of claim 9, wherein the RA message one includes an indicator indicating transmission time interval bundling is used in the RA message three.

12. The method of claim 9, wherein the RA message one includes an indicator indicating a request for resource allocation for transmission time interval bundling in the RA message three.

13. The method of claim 12, wherein the special preamble group is signaled to the UA in a Broadcast Control Channel.

14. The method of claim 12, wherein the RA message two provides a resource allocation or uplink grant of a radio resource sufficient for the UA to use transmission time interval bundling in at least one of the RA messages.

15. A user agent (UA), comprising:
a component configured such that the UA sends a RA message one indicating a special preamble to an access device and receives a RA message two from the access device, the RA message two providing a resource allocation or uplink grant of a radio resource in response to the RA message one, the component further configured such that the UA sends a RA message three to the access device using transmission time interval bundling provided in the RA message two, wherein the special preamble indicates a request for resource allocation for with transmission time interval bundling in the RA message three, and the special preamble is selected from a special preamble group signaled by the access device.

16. The UA of claim 15, wherein the RA message one includes an indicator indicating transmission time interval bundling is used in the RA message three.

17. The UA of claim 15, wherein the RA message one includes an indicator indicating a request for resource allocation for transmission time interval bundling in the RA message three.

18. The UA of claim 15, wherein the RA message two provides a resource allocation or uplink grant of a radio resource sufficient for the UA to use transmission time interval bundling in at least one of the RA messages.

19. The UA of claim 17, wherein the RA message two provides a resource allocation or uplink grant of a radio resource sufficient for the UA to use transmission time interval bundling in at least one of the RA messages.

20. The UA of claim 15, wherein the special preamble group is signaled to the UA in a Broadcast Control Channel.

21. The UA of claim 15, further comprising the UA measuring a signal quality of at least one channel associated with the access device and determining whether to use transmission time interval bundling based on the measured signal quality.

22. The UA of claim 21, wherein the signal quality is further defined as a signal-to-noise ratio, and further comprising determining whether to use transmission time interval bundling if the signal-to-noise ratio is below a threshold.

23. An access device, comprising:
a component configured such that the access device signals a special preamble group to the UA indicating special preambles to be used by the UA for requesting resource allocation with transmission time interval bundling, receives a RA message one from a user agent (UA) and sends a RA message two to the UA, the RA message two providing a resource allocation or uplink grant of a radio resource in response to the RA message one, the component further configured such that the access device receives a RA message three sent by the UA using transmission time interval bundling provided in the RA message two, wherein the RA message one indicates a special preamble, wherein the special preamble is selected from the special preamble group signaled by the access device and indicates a request for resource allocation with transmission time interval bundling in the RA message three.

24. The access device of claim 23, wherein the component is further configured to provide a resource allocation or uplink grant of a radio resource sufficient for the UA to use transmission time interval bundling.

25. The access device of claim 23, wherein the RA message one includes an indicator indicating transmission time interval bundling is used in the RA message three.

26. The access device of claim 23, wherein the RA message one includes an indicator indicating a request for resource allocation for transmission time interval bundling in the RA message three.

27. The access device of claim 26, wherein the special preamble group is signaled to the UA in a Broadcast Control Channel.

28. The access device of claim 26, wherein the RA message two provides a resource allocation or uplink grant of a radio resource sufficient for the UA to use transmission time interval bundling in at least one of the RA messages.

* * * * *

UNITED STATES PATENT AND TRADEMARK OFFICE
CERTIFICATE OF CORRECTION

| | | |
|---|---|---|
| PATENT NO. | : 8,300,608 B2 | Page 1 of 1 |
| APPLICATION NO. | : 12/558245 | |
| DATED | : October 30, 2012 | |
| INVENTOR(S) | : Yi Yu et al. | |

It is certified that error appears in the above-identified patent and that said Letters Patent is hereby corrected as shown below:

Column 2, Line 36, replace "in" with -- "In" --

Claim 9, Column 11, Line 20, replace "IRA" with -- "RA" --

Claim 15, Column 11, Line 60, replace "a request for resource allocation for with" with -- "a request for resource allocation with" --

Signed and Sealed this
Eighteenth Day of December, 2012

David J. Kappos
*Director of the United States Patent and Trademark Office*